(12) United States Patent
Tamburello et al.

(10) Patent No.: US 10,422,481 B2
(45) Date of Patent: Sep. 24, 2019

(54) HEATING AND COOLING SYSTEM FOR AN ON-BOARD GAS ADSORBENT STORAGE VESSEL

(71) Applicant: Savannah River Nuclear Solutions, LLC, Aiken, SC (US)

(72) Inventors: David A. Tamburello, Aiken, SC (US); Donald L. Anton, Aiken, SC (US); Bruce J. Hardy, Graniteville, SC (US); Claudio Corgnale, Aiken, SC (US)

(73) Assignee: Savannah River Nuclear Solutions, LLC, Alken, SC (US)

(*) Notice: Subject to any disclaimer, the term of this patent is extended or adjusted under 35 U.S.C. 154(b) by 94 days.

(21) Appl. No.: 15/597,336

(22) Filed: May 17, 2017

(65) Prior Publication Data

US 2017/0314738 A1 Nov. 2, 2017

Related U.S. Application Data

(62) Division of application No. 14/546,107, filed on Nov. 18, 2014, now Pat. No. 9,683,704.

(Continued)

(51) Int. Cl.
*F17C 13/00* (2006.01)
*F02B 43/12* (2006.01)
(Continued)

(52) U.S. Cl.
CPC ....... *F17C 13/005* (2013.01); *B60H 1/00271* (2013.01); *B60H 1/14* (2013.01);
(Continued)

(58) Field of Classification Search
CPC ....... F17C 11/00; F17C 11/005; F17C 11/007; F17C 2227/0309; F17C 2227/0323;
(Continued)

(56) References Cited

U.S. PATENT DOCUMENTS

| 2,499,404 A | 3/1950 | Marsh |
| 5,211,023 A | 5/1993 | Matsuura |

(Continued)

FOREIGN PATENT DOCUMENTS

| EP | 1717511 | 11/2006 |
| JP | 2001-239847 | * 9/2001 ............... F17C 11/00 |

*Primary Examiner* — Christopher R Zerphey
(74) *Attorney, Agent, or Firm* — Dority & Manning, P.A.

(57) ABSTRACT

In one aspect, a system for controlling the temperature within a gas adsorbent storage vessel of a vehicle may include an air conditioning system forming a continuous flow loop of heat exchange fluid that is cycled between a heated flow and a cooled flow. The system may also include at least one fluid by-pass line extending at least partially within the gas adsorbent storage vessel. The fluid by-pass line(s) may be configured to receive a by-pass flow including at least a portion of the heated flow or the cooled flow of the heat exchange fluid at one or more input locations and expel the by-pass flow back into the continuous flow loop at one or more output locations, wherein the by-pass flow is directed through the gas adsorbent storage vessel via the by-pass line(s) so as to adjust an internal temperature within the gas adsorbent storage vessel.

12 Claims, 5 Drawing Sheets

Related U.S. Application Data (60) Provisional application No. 61/905,557, filed on Nov. 18, 2013.

(51) Int. Cl.
| | | |
|---|---|---|
| *F02M 21/02* | (2006.01) | |
| *F02M 21/06* | (2006.01) | |
| *F17C 11/00* | (2006.01) | |
| *F25B 5/02* | (2006.01) | |
| *B60H 1/00* | (2006.01) | |
| *F25B 41/04* | (2006.01) | |
| *F25B 6/02* | (2006.01) | |
| *B60H 1/14* | (2006.01) | |

(52) U.S. Cl.
CPC ......... *F02B 43/12* (2013.01); *F02M 21/0221* (2013.01); *F02M 21/06* (2013.01); *F17C 11/00* (2013.01); *F17C 11/007* (2013.01); *F25B 5/02* (2013.01); *F25B 6/02* (2013.01); *F25B 41/04* (2013.01); *F17C 2227/0395* (2013.01); *F17C 2250/0631* (2013.01); *F17C 2270/0168* (2013.01); *F25B 2400/0403* (2013.01); *F25B 2400/0409* (2013.01); *Y02T 10/32* (2013.01)

(58) Field of Classification Search
CPC ...... F17C 2227/0341; F17C 2227/0355; F17C 2227/0348; B60H 1/00271; B60H 1/14
See application file for complete search history.

(56) References Cited

U.S. PATENT DOCUMENTS

| | | |
|---|---|---|
| 8,464,668 B2 | 6/2013 | Dipaola et al. |
| 9,683,704 B2* | 6/2017 | Tamburello ............. F02B 43/12 |
| 2004/0247959 A1* | 12/2004 | Kimbara ............. B60L 11/1883 |
| | | 429/437 |
| 2006/0180235 A1 | 8/2006 | Kubo et al. |
| 2008/0216487 A1 | 9/2008 | Handa |
| 2013/0056194 A1 | 3/2013 | Cregut et al. |
| 2013/0206360 A1 | 8/2013 | Zhang et al. |
| 2013/0305745 A1 | 11/2013 | Drube et al. |
| 2015/0129161 A1* | 5/2015 | Nishikawa ............. B60K 11/02 |
| | | 165/43 |

* cited by examiner

HEATING AND COOLING SYSTEM FOR AN ON-BOARD GAS ADSORBENT STORAGE VESSEL

CROSS-REFERENCE TO RELATED APPLICATIONS

This application is a continuation of and claims the right of priority to U.S. patent application Ser. No. 14/546,107, filed on Nov. 18, 2018, which, in turn, is based upon and claims priority to U.S. Provisional Patent Application No. 61/905,557, filed on Nov. 18, 2013, the disclosures of both of which are hereby incorporated by reference herein in their entirety for all purposes.

This invention was made with Government support under Contract No. DE-AC09-08SR22470, awarded by the U.S. Department of Energy. The Government has certain rights in the invention.

FIELD OF THE INVENTION

The present subject matter relates generally to a heating and cooling system for a mobile, gas adsorbent storage vessel (e.g. an adsorbent natural gas (ANG) storage vessel), such as a gas adsorbent storage vessel carried within a vehicle.

BACKGROUND OF THE INVENTION

Natural gas is normally stored on motor vehicles in high pressure tanks that rely on changes in pressure to charge and discharge the gas. For example, such tanks are typically charged with extremely high pressure gas at or near the maximum design pressure of the tank, with the pressure within the tank slowly decreasing as natural gas is discharged from the tank. Unfortunately, the gas capacity of each high pressure tank is limited by its maximum design pressure. As an alternative to high pressure tanks, an adsorbent, such as activated carbon or a metal-organic framework (MOF), may be used within a tank of similar volume to store the same amount of gas at a lower pressure. As a result, the "gas adsorbent" tank may provide increased gas capacity at its maximum design pressure over that provided by a conventional high pressure tank. However, even for gas adsorbent tanks, improvements are still needed for increasing the overall gas capacity of each tank and/or for improving the manner in which natural gas is adsorbed/released within each tank.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling the temperature within a gas adsorbent storage vessel of a vehicle. The system may generally include an air conditioning system forming a continuous flow loop of heat exchange fluid that is directed through one or more air conditioning system components such that the heat exchange fluid cycles between a heated flow and a cooled flow. The system may also include at least one fluid by-pass line in fluid communication with the continuous flow loop at one or more input locations and at one or more output locations. The fluid by-pass line(s) may include a portion extending within the gas adsorbent storage vessel. In addition, the fluid by-pass line(s) may be configured to receive a by-pass flow including at least a portion of at least one of the heated flow or the cooled flow of the heat exchange fluid at the one or more input locations and expel the by-pass flow back into the continuous flow loop at the one or more output locations, wherein the by-pass flow is directed through the gas adsorbent storage vessel via the by-pass line(s) so as to adjust an internal temperature within the gas adsorbent storage vessel.

In another aspect, the present subject matter is directed to a system for controlling the temperature within a gas adsorbent storage vessel of a vehicle. The system may generally include an engine cooling system and an air conditioning system of the vehicle. The engine cooling system may form a first continuous flow loop of a first heat exchange fluid and the air conditioning system may for a second continuous flow loop of a second heat exchange fluid. In addition, the system may include at least one fluid by-pass line in fluid communication with the first continuous flow loop and/or the second continuous flow loop at one or more input locations and at one or more output locations. The fluid by-pass line(s) may include a portion extending within the gas adsorbent storage vessel. Moreover, the fluid by-pass line(s) may be configured to receive a by-pass flow including at least a portion of the first heat exchange fluid and/or the second heat exchange fluid at the one or more input locations and expel the by-pass flow back into the first continuous flow loop and/or the second continuous flow loop at the one or more output locations, wherein the by-pass flow is directed through the gas adsorbent storage vessel via the by-pass line(s) so as to adjust an internal temperature within the gas adsorbent storage vessel.

These and other features, aspects, and advantages of the present invention will become better understood with reference to the following description and appended claims. The accompanying drawings, which are incorporated in and constitute a part of this specification, illustrate embodiments of the invention, and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for controlling the temperature within a gas adsorbent storage vessel of a vehicle, such as an adsorbent natural gas (ANG) storage vessel carried within a vehicle. Specifically, in several embodiments, the system may be configured to fluidly connect the ANG storage vessel to the existing heat exchanger (HX) fluid(s) contained within the vehicle so as to provide the temperature swing capabilities necessary to increase and/or maximize its storage capacity. For example, in one embodiment, one or more by-pass lines may be provided in fluid communication with the HX fluid flowing within the existing air conditioning (AC) system of a vehicle. In such an embodiment, a heated or cooled flow of the HX fluid may be directed through the by-pass line(s) and into the ANG storage vessel (e.g., within an internal heat exchanger formed at least partially by the bypass line(s)) to allow the internal temperature within the storage vessel to be controlled/adjusted. In addition to the AC system (or as an alternative thereto), one or more by-pass lines may also be provided in fluid communication with the fluid flowing within the existing engine cooling system of a vehicle. For example, the heated HX fluid flowing within the engine cooling system may be directed through the by-pass line(s) and into the ANG storage vessel to allow the internal temperature within the storage vessel to be increased.

It should be appreciated that, in general, the present subject matter will be described herein with reference to controlling the internal temperature within an ANG storage vessel. However, those of ordinary skill in the art, using the disclosure provided herein, should readily understand that the disclosed system may be utilized to control the temperature within any other suitable storage vessel containing an adsorbent configured to adsorb/release a gas at differing temperatures/pressures (referred to herein, generally, as a gas adsorbent storage vessel).

Figure 1:
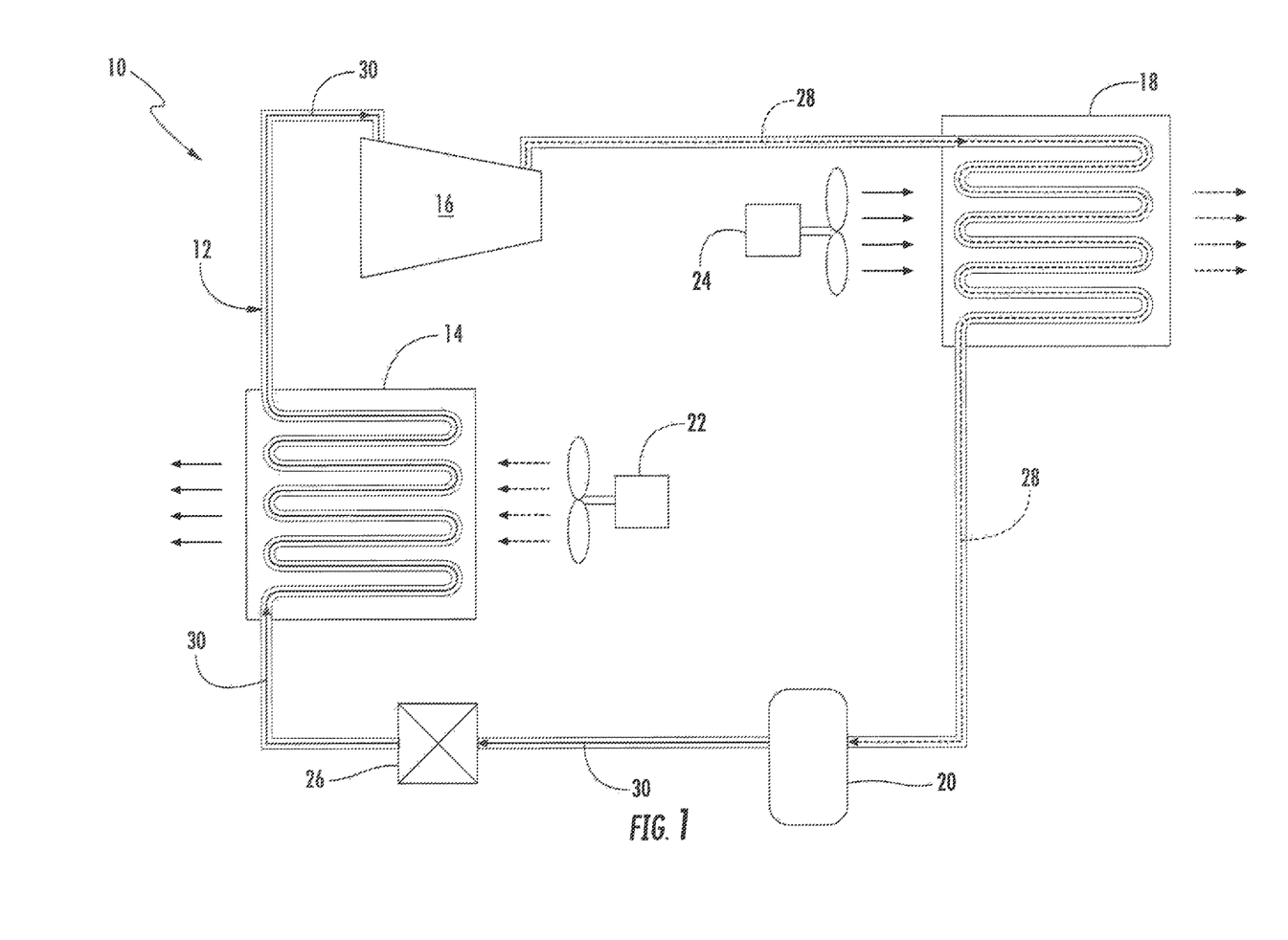
FIG. 1 illustrates a schematic diagram of one embodiment of an air conditioning system for a vehicle.

Referring now to the drawings, FIG. 1 illustrates a schematic diagram of one embodiment of a conventional automotive air conditioning (AC) system 10. As shown, the AC system 10 may generally form a continuous flow loop 12, wherein a heat exchange fluid or HX fluid (such as Freon, R-12, R-22, HFC-134a, etc.) is continuously cycled through the various components of the AC system 10. Specifically, in several embodiments, the HX fluid may be cycled through an evaporator 14, a compressor 16, a condenser 18 and a dryer 20 of the AC system 10 such that heat is released from and absorbed by the HX fluid as it directed around the continuous flow loop 12.

As is generally understood, the HX fluid may be directed into the evaporator 14 as a cold, low pressure liquid, within which it is gasified or vaporized. In doing so, the evaporator 14 may serve as the source of cold air for the AC system 10. For example, as shown in FIG. 1, an evaporator blower or fan 22 may be configured to direct an air flow across the coils of the evaporator 14 such that heat contained within the air flow is absorbed by the HX fluid, thereby cooling the air. The cooled air flow may then be directed into the passenger compartment of the associated vehicle.

Additionally, as shown in FIG. 1, the low pressure, gaseous HX fluid exiting the evaporator 14 may then be directed into the compressor 16, which is generally configured to increase the pressure of the HX fluid prior to the fluid being supplied into the condenser 18. For example, the compressor 16 may include a belt-driven pump that is configured to substantially increase the gas pressure of the HX fluid. The high pressure, gaseous HX fluid then flows into the condenser 18, within which the HX fluid is liquefied. For example, as shown in FIG. 1, a condenser blower or fan 24 may be configured to direct an air flow across the coils of the condenser 18 that absorbs heat from the HX fluid, thereby liquefying the HX fluid within the condenser 18.

Moreover, as shown in FIG. 1, the liquefied, high pressure HX fluid may then pass through the dryer 20 to condition the fluid prior to it being directed into a metering device 26 (e.g., a thermal expansion valve or orifice tube) that controls the overall flow rate of the HX fluid within the system 10. For example, the dryer 20 may include desiccants that remove water contained within the HX fluid. The conditioned, high pressure HX fluid is then allowed to expand within the metering device 26, thereby reducing both the pressure and the temperature of the HX fluid. The cold, low pressure HX fluid is then cycled back to the evaporator 14 and the process is repeated.

For purposes of the description provided herein, the continuous flow loop 12 formed by the AC system 10 will be described as including both a heated flow 28 and a cooled flow 30 of the HX fluid as the fluid is cycled through the various components of the system 10. Specifically, as shown in FIG. 1, the heated flow 28 of the HX fluid (indicated by the dashed lines) will be described as the portion of the continuous flow loop 12 flowing from the compressor 16 through the condenser 18 to the dryer 20. Similarly, the cooled flow 30 of the HX fluid (indicated by the solid lines) will be described as the portion of the continuous flow loop 12 flowing from the dryer 20 through the evaporator 14 and back to the compressor 16.

Figure 2:
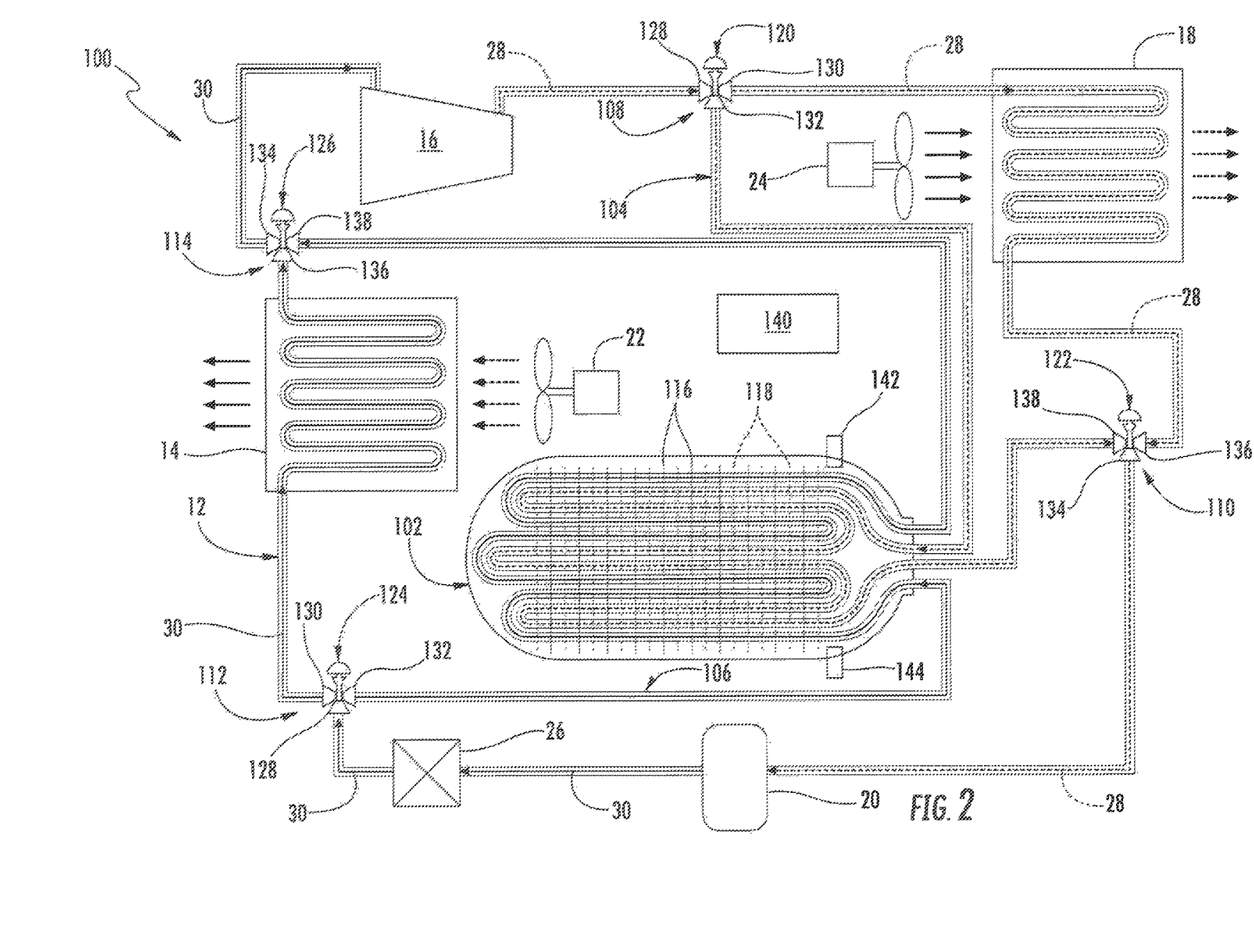
FIG. 2 illustrates a schematic diagram of one embodiment of a system for controlling the temperature within an adsorbent natural gas (ANG) storage vessel of a vehicle in accordance with aspects of present subject matter, particularly illustrating the system utilizing heated and cooled flows of heat exchange fluid supplied from the air conditioning system shown in FIG. 1 to adjust the temperature within the ANG storage vessel.

Referring now to FIG. 2, one embodiment of a system 100 for controlling the temperature within an adsorbent natural gas (ANG) storage vessel 102 of a vehicle is illustrated in accordance with aspects of present subject matter. As shown in FIG. 2, the system 100 may generally be configured to build on the AC system 10 shown in FIG. 1 by adding by-pass lines that are routed from one or more locations around the continuous flow loop 12 through the interior of the ANG storage vessel 102, thereby providing a means for supplying a heated and/or cooled by-pass flow of the HX fluid to the storage vessel 102 for adjusting the vessel's internal temperature. Specifically, when cooling is needed within the ANG storage vessel 102, such as during refueling or to maintain capacity, all or a portion of the cooled flow 30 of the HX fluid may be diverted through the storage vessel 102 as opposed to being directed through the evaporator 14.

Similarly, when heating is desired within the ANG storage vessel 102, such as during driving/discharge, all or a portion of the heated flow 28 of HX fluid may be diverted through the storage vessel 102 as opposed to being directed through the condenser 18. As a result, the internal temperature within the ANG storage vessel 102 may be increased and/or decreased, as necessary, to allow natural gas to be adsorbed into and/or released from the adsorbent contained within the storage vessel 102.

It should be appreciated that the ANG storage vessel 102 utilized in connection with the present subject matter may generally correspond to any suitable pressure vessel having an adsorbent contained therein that is configured to adsorb/release natural gas. For example, suitable adsorbent may include, but are not limited to, activated carbon and/or a covalent metal-organic framework. As will be described below, the adsorbent may be configured to absorb natural gas at or below a first temperature (e.g., at a relatively cold temperature) and release natural gas at or above a second temperature (e.g., a relatively hot temperature). Accordingly, the heated/cooled flow 28, 30 of HX fluid that is diverted from the continuous flow loop 12 of the AC system 10 into the ANG storage vessel 102 may be used increase/decrease the internal temperature within the storage vessel 102 and, thus, the temperature of the adsorbent, thereby controlling the absorption/release of natural gas.

In several embodiments, the system 100 may include both a first by-pass line 104 and a second by-pass line 106. As shown in FIG. 2, the first by-pass line 104 may be in fluid communication with the continuous flow loop 12 of the AC system 10 at a first input location 108 and a first output location 110, with the first by-pass line 104 being configured to receive all or a portion of the heated flow 28 of HX fluid at the first input location 108 and expel such HX fluid back into the continuous flow loop 12 at the first output location 110. For example, in the illustrated embodiment, the first input location 108 is located immediately downstream of the compressor 16 such that all or a portion of the heated, high pressure HX fluid expelled from the compressor 16 may be directed into the first by-pass line 104 and the first output location 110 is located immediately downstream of the condenser 18 such that the high pressure HX fluid may be supplied back into the continuous flow loop 12 upstream of the dryer 20. Similarly, as shown in FIG. 2, the second by-pass line 106 may be in fluid communication with the continuous flow loop 12 at a second input location 112 and a second output location 114, with the second by-pass line 106 being configured to receive all or a portion of the cooled flow 30 of HX fluid at the second input location 112 and expel such HX fluid back into the continuous flow loop at the second output location 114. For example, in the illustrated embodiment, the second input location 112 is located immediately downstream of the metering device 26 such that all or a portion of the cold, low pressure HX fluid expelled from the metering device 26 may be directed into the second by-pass line 106 and the second output location 114 is located immediately downstream of the evaporator 14 such that the low pressure HX fluid may be supplied back into the continuous flow loop 12 upstream of the compressor 16.

It should be appreciated that, as used herein, the term "by-pass line" refers simply to a flow path for fluid. Thus, a by-pass line may be formed from a single fluid conduit that defines a flow path for fluid or two or more fluid conduits in fluid communication with one another so as to define a flow path for fluid. In addition, it should be appreciated that, in embodiments in which the bypass line is formed using two or more fluid conduits, the conduits may be in fluid communication with one another directly and/or indirectly (e.g., via a valve, etc.).

Additionally, as shown in FIG. 2, at least a portion of each of the first and second by-pass lines 104, 106 may be configured to extend within the ANG storage vessel 102, thereby allowing for heat to be transferred between the HX fluid flowing within the first and/or second by-pass lines 104, 106 and the gas/adsorbent contained within the storage vessel 102. For example, by directing at least a portion of the heated flow 28 of HX fluid between the input and output locations 108, 110 associated with the first by-pass line 104, such heated HX fluid may be directed through the ANG storage vessel 102 so as to increase the internal temperature within the vessel 102. Similarly, by directing at least a portion of the cooled flow 30 of HX fluid between the input and output locations 112, 114 associated with the second by-pass line 106, such cooled HX fluid may be directed through the ANG storage vessel 102 so as to decrease the internal temperature within the vessel 102.

In several embodiments, the portions of the first and second by-pass lines 104, 106 extending within the storage vessel 102 may be provided in a looped or coiled configuration, thereby creating an internal heat exchanger-type arrangement with the interior of the storage vessel 102. For example, as shown in FIG. 2, both the first and second by-pass lines 104, 106 may be coiled in a serpentine-like pattern within the ANG storage vessel 102. Additionally, as shown in FIG. 2, a plurality of heat exchange fins 116, 118 may also be provided in association with the first and second by-pass lines 104, 106 so as to enhance the heat transfer occurring within the ANG storage vessel 102. For instance, a plurality of first heat exchange fins 116 may be provided in association with the first by-pass line 104 and a plurality of second heat exchange fins 118 may be provided in association with the second by-pass line 106.

Referring still to FIG. 2, the system 100 may also include a plurality of valves for controlling the flow of HX fluid through the first and second by-pass lines 104, 106. For example, as shown in the illustrated embodiment, the system 100 may include a first input valve 120 positioned at the first input location 108 for controlling the amount of the heated flow 28 directed into the first by-pass line 104 and a first output valve 122 positioned at the first output location 110 for directing the HX fluid diverted through the first by-pass line 104 back into the continuous flow loop 12 immediately downstream of the condenser 18. Similarly, the system 100 may include a second input valve 124 positioned at the second input location 112 for controlling the amount of the cooled flow 30 directed into the second by-pass line 106 and a second output valve 126 positioned at the second output location 114 for directing the HX fluid diverted through the second by-pass line 106 back into the continuous flow loop 12 immediately downstream of the evaporator 14.

As shown in FIG. 2, in several embodiments, each of the valves 120, 122, 124, 126 may correspond to three-way valves, thereby allowing all or a portion of the HX fluid to be both diverted through the first and/or second by-pass lines 104, 106 at the input locations 108, 112 when heating and/or cooling is needed within the ANG storage vessel 102 and re-directed back into the continuous flow loop 12 at the output locations 110, 114. For example, each of the input valves 120, 124 may include a single input port 128 and two output ports (e.g., an AC output port 130 in fluid communication with the continuous flow loop 12 and a by-pass output port 132 in fluid communication with the associated by-pass line 104, 106). As a result, when heating/cooling is not needed, the by-pass output ports 132 may be closed, thereby allowing the HX fluid to be cycled exclusively around the continuous flow loop 12 of the AC system 10. However, when heating/cooling is desired, the by-pass output port 132 of the appropriate input valve 120, 124 may be fully or partially opened to allow all or a portion of the HX fluid (depending on whether the associated AC output port 130 is opened or closed) to be diverted into the corresponding by-pass valve 104 106.

Similarly, each of the output valves 122, 126 may include a single output port 134 and two input ports (e.g., an AC input port 136 in fluid communication with the continuous flow loop 12 and a by-pass input port 138 in fluid communication with the associated by-pass line 104, 106). As a result, when HX fluid is not being directed through the by-pass lines 104, 106, the by-pass input ports 138 may be closed. However, when HX fluid is being directed through one of the by-pass lines 104, 106, the by-pass input port 138 of the appropriate output valve 122, 126 may be opened to allow the HX fluid flowing through the corresponding by-pass line 104, 106 to be reintroduced back into the continuous flow loop 12 of the AC system 10.

As will be described in greater detail below with reference to FIG. 3, in several embodiments, the various valves 120, 122, 124, 126 of the disclosed system 100 may be configured to be electronically controlled via a suitable controller 140. For example, the controller 140 may be configured to receive an indication that heating is needed within the ANG storage vessel 102 (e.g., by receiving a measurement signal from a temperature sensor 142 and/or a pressure sensor 144 associated with the storage vessel 102). In such instance, the controller 140 may be configured to transmit suitable control signals for controlling the operation of the first input valve 120 such that all or a portion of the heated flow 28 of HX fluid is diverted into the first by-pass line 104. Similarly, when an indication is received by the controller 140 that cooling is needed within the ANG storage vessel 102, the controller 140 may be configured to transmit suitable control signals for controlling the operation of the second input valve 124 such that all or a portion of the cooled flow 30 of HX fluid may be diverted into the second by-pass line 106.

It should be appreciated by those of ordinary skill in the art that, in certain instances, the typical HX fluid(s) utilized within a vehicle's AC system 10 may not exhibit the minimum and/or maximum temperature capabilities necessary for properly heating and/or cooling the ANG storage vessel. In such instances, an alternative HX fluid(s) may be supplied within the AC system 10 so as to provide the minimum and/or maximum temperature capabilities required for the adsorbent contained within the storage vessel 102.

Figure 3:
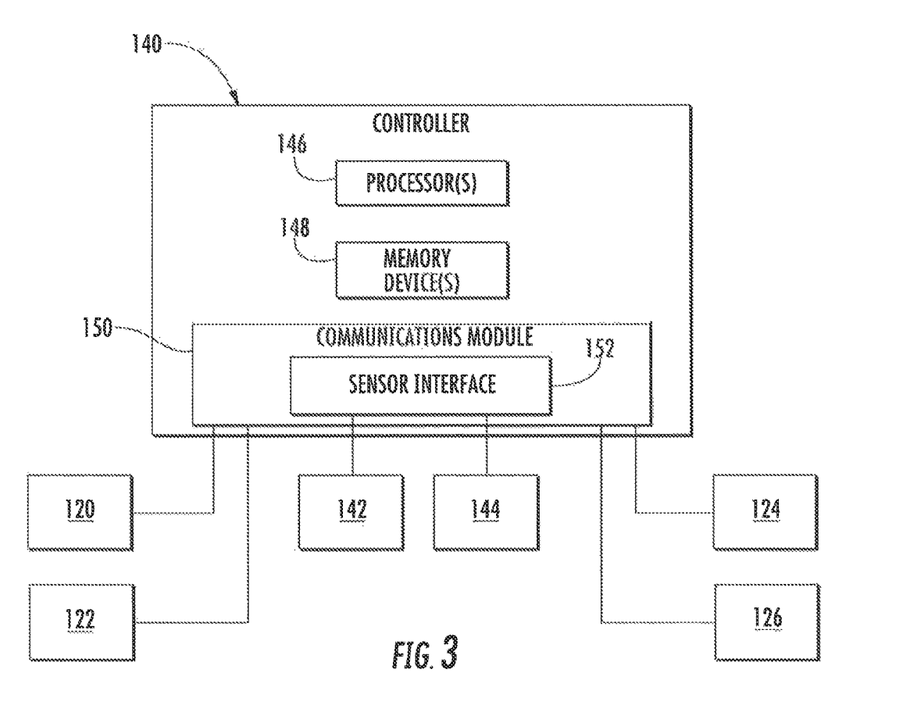
FIG. 3 illustrates a schematic diagram of one embodiment of various components that may be included within or associated with a suitable controller for controlling one or more of the system components described herein in accordance with aspects of the present subject matter.

Referring now to FIG. 3, a schematic diagram of system components that may be utilized for automatically controlling the operation of the valves described herein is illustrated in accordance with aspects of the present subject matter. As shown, the system 100 may include a controller (e.g., controller 140 of FIG. 2) communicatively coupled to each of the valves 120, 122, 124, 126. For example, in the illustrated embodiment, the controller 140 is communicatively coupled to each of the valves 120, 122, 124, 126 via a wired connection. However, in other embodiments, the controller 140 may be communicatively coupled to each of the valves 120, 122, 124, 126 via a wireless connection, such as by using any suitable wireless communication protocol.

In general, the controller 140 may correspond to any suitable computing device and/or other processing device. Thus, in several embodiments, the controller 140 may include one or more processor(s) 146 and associated memory device(s) 148 configured to perform a variety of computer-implemented functions (e.g., performing the functions described herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 148 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 148 may generally be configured to store suitable computer-readable instructions that, when implemented by the processor(s) 146, configure the controller 140 to perform various functions including, but not limited to, monitoring the internal temperature and/or pressure within the ANG storage vessel 102 and/or transmitting suitable control signals to the valves 120, 122, 124, 126.

Additionally, the controller 140 may also include a communications module 150 to facilitate communications between the controller 140 and one or more of the other components of the system 100. For instance, the communications module 150 may allow for the controller 140 to transmit control signals to each valve 120, 122, 124, 126 for controlling its operation. Additionally, the communications module 150 may include a sensor interface 152 (e.g., one or more analog-to-digital converters) to permit the signals transmitted by one or more sensors to be converted into signals that can be understood and processed by the processors 146. For example, as shown in FIG. 3, the sensor interface 152 may be communicatively coupled to one or more temperature sensors 142 configured to monitor the internal temperature within the ANG storage vessel 102 and/or one or more pressure sensors 144 configured to monitor the internal pressure within the storage vessel 102.

It should be appreciated that, in several embodiments, the controller 140 may correspond to an existing controller of the vehicle within which the disclosed system is installed. For example, the controller 140 may form all or a part of the existing vehicle control system. Alternatively, the controller 140 may correspond to a separate processing device. For instance, in one embodiment, the controller 140 may form all or part of a separate plug-in module that may be installed within the vehicle to allow for the disclosed system to be implemented without requiring additional software to be uploaded onto existing control devices within the vehicle.

In several embodiments, the controller 140 may be configured to continuously monitor the internal temperature and/or the internal pressure within the ANG storage vessel 102 (e.g., via the sensor(s) 142, 144) to determine when to open the appropriate the input valve 120, 124 for allowing the heated or cooled flow 28, 30 of HX fluid to be diverted from the continuous flow loop 12 of the AC system 10 to the corresponding by-pass line 104, 106 for heating/cooling the storage vessel 102. For example, as indicated above, the adsorbent utilized within the ANG storage vessel 102 may be configured to adsorb natural gas at colder temperatures and release natural gas at hotter temperatures. Of course, one of ordinary skill in the art should readily appreciate that the specific absorption/release temperatures may generally vary from adsorbent-to-adsorbent.

However, as an example, the adsorbent used within the ANG storage vessel 102 may, in several embodiments, be configured to adsorb natural gas at a temperature ranging from about −100° C. to about 0° C. and release natural gas at a temperature ranging from about 50° C. to about 150° C. In such embodiments, when it is desired for natural gas to be adsorbed into the adsorbent contained within the storage vessel 102 (e.g., during refueling of the vessel 102), the controller 140 may be configured to control the operation of the appropriate valve(s) such that the internal temperature within the storage vessel 102 is maintained within the required absorption temperature range. For instance, if the internal temperature within the storage vessel 102 is greater than 0° C., the controller 140 may be configured to transmit a suitable control signal to the second input valve 124 to allow all or a portion of the cooled flow 30 of HX fluid to be supplied to the ANG storage vessel 102. Similarly, when it is desired for natural gas to be released by the adsorbent (e.g., when fueling the vehicle during operation), the controller 140 may be configured to control the operation of the appropriate valve(s) such that the internal temperature within the storage vessel 102 is maintained within the required release temperature range. For instance, if the internal temperature is below 50° C., the controller 140 may be configured to transmit a suitable control signal to the first input valve 120 to allow all or a portion of the heated flow 28 of HX fluid to be supplied to the ANG storage vessel 102.

In addition to the internal temperature, the controller 140 may also be configured to take into account the internal pressure of the storage vessel 102 when controlling the operation of the valves. For instance, in several embodiments, it may be desirable to maintain the internal pressure within a given pressure range, such as pressure range of from about 15 bars to about 50 bars. In such embodiments, if the internal pressure within the ANG storage vessel 102 is less than 15 bars, the controller 140 may be configured to transmit a suitable control signal to the first input valve 122 to allow all or a portion of the heated flow 28 of HX fluid to be supplied into the storage vessel, 102 thereby increasing both the temperature and the pressure within the interior of the storage vessel 102. Similarly, if the internal pressure within the ANG storage vessel 102 is greater than 50 bars, the controller 140 may be configured to transmit a suitable control signal to the second input valve 124 to allow all or a portion of the cooled flow 30 of HX fluid to be supplied to the storage vessel 102, thereby providing for a decreasing both the temperature and the pressure within the interior of the storage vessel 102.

It should be appreciated that the combination of the measurement signals provided by the temperature sensor(s) 142 and the pressure sensor(s) 144 may also be used by the controller 140 to determine if the storage vessel 102 is leaking. For instance, a relatively high internal temperature combined with a relatively low internal pressure may provide an indication to the controller 140 that the storage vessel 102 has developed a leak.

It should also be appreciated that, although the controller 140 has been described above with reference to FIG. 3 as being communicatively coupled to the valves associated with the embodiment of the system 100 shown in FIG. 2, the controller 140 may generally be coupled to any of the components described herein for automatically controlling their operation. For instance, in the embodiment described below with reference to FIG. 4, the controller 140 may be communicatively coupled to any combination of the first and second input valves 208, 212, the first and second output valves 210, 214 and the common input and output valves 274, 276 for controlling the operation of such valve(s). Similarly, in the embodiment described below with reference to FIG. 5, the controller 140 may be communicatively coupled to any combination of the first and second input valves 320, 322 and the first and second output valves 324, 326 for controlling the operation of such valve(s).

Figure 4:
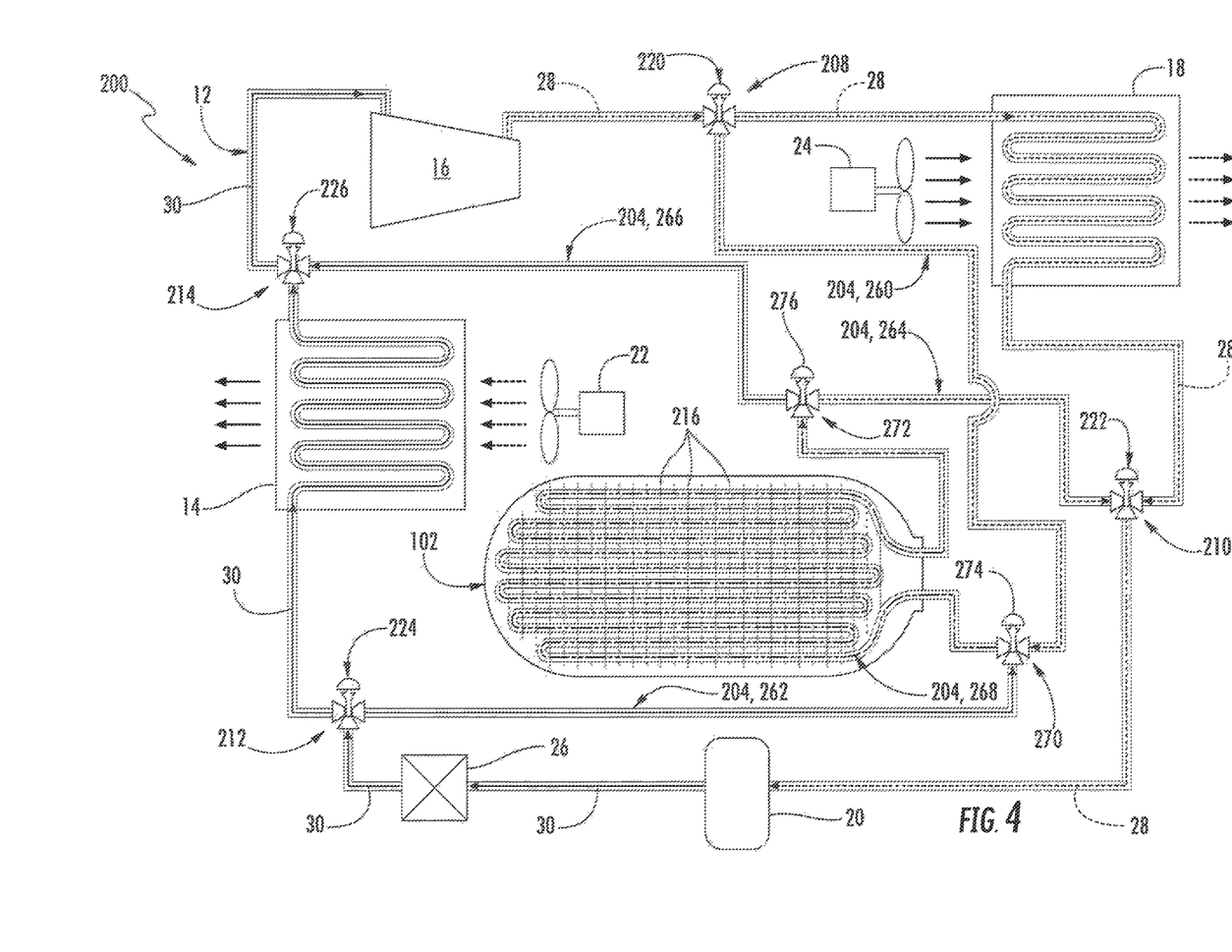
FIG. 4 illustrates a schematic diagram of another embodiment of a system for controlling the temperature within an adsorbent natural gas (ANG) storage vessel of a vehicle in accordance with aspects of present subject matter.

Referring now to FIG. 4, another embodiment of a system 200 for controlling the temperature within an adsorbent natural gas (ANG) storage vessel 102 of a vehicle is illustrated in accordance with aspects of present subject matter. As shown, unlike the embodiment described above in which the system 100 includes separate hot and cold by-pass lines 104, 106, the system 200 includes a single hot/cold by-pass line extending within the storage vessel 102. Specifically, given that the same HX fluid is used for heating and cooling the ANG storage vessel 102 (only in different phases), a common by-pass line may be utilized to supply HX fluid within the storage vessel 102. Such a configuration may generally minimize the access points required within the storage vessel 102 and may also reduce the overall size of the internal heat exchanger formed within the storage vessel 102.

As shown in FIG. 4, the system 200 may generally include a by-pass line 204 comprised of a plurality of interconnected by-pass portions for supplying heated and/or cooled HX fluid within the ANG storage vessel 102. Specifically, in several embodiments, the by-pass line 204 may include first and second input portions 260, 262, first and second output portions 264, 266 and a common by-pass portion 268 extending at least partially within the ANG storage vessel 102 between the first and second input portions 260, 262 and the first and second output portions 264, 266.

As shown in FIG. 4, the first input portion 260 may generally be configured to extend between the continuous flow loop 12 of the AC system 10 and the common by-pass portion 268 of the by-pass line 204, with the first input portion 260 being in fluid communication with the continuous flow loop 10 at a first input location 208 and being in fluid communication with the common by-pass portion 268 at a common input location 270. In addition, the second input portion 262 may also be configured to extend between the continuous flow loop 12 of the AC system 10 and the common by-pass portion 268, with the second input portion 262 being in fluid communication with the continuous flow loop 10 at a second input location 212 and being in fluid communication with the common by-pass portion 268 at the common input location 270. In such an embodiment, the first input location 208 may generally be located on the continuous flow loop 12 so as to intersect the heated flow 28 of HX fluid (e.g., immediately downstream of the compressor 16) while the second input location 212 may generally be located on the continuous flow loop 12 so as to intersect the cooled flow 30 of HX fluid (e.g., immediately downstream of the metering device 26). As a result, when it is desired to increase the internal temperature within the ANG storage vessel 102, all or a portion of the heated, high pressure HX fluid expelled from the compressor 16 may be directed through the first input portion 260 and into the common by-pass portion 268 (e.g., at the common input location 270) prior to being supplied into the storage vessel 102. Similarly, when it is desired to decrease the internal temperature within the ANG storage vessel 102, all or a portion of the cold, low pressure HX fluid expelled from the metering device 26 may be directed through the second input portion 262 and into the common by-pass portion 268 (e.g., at the common input location 270) prior to be supplied into the storage vessel 102.

Additionally, as shown in FIG. 4, the first output portion 264 may generally be configured to extend between the common by-pass portion 268 and the continuous flow loop 12 of the AC system 10, with the first output portion 264 being in fluid communication with the common bypass portion 268 at a common output location 272 and being in fluid communication with the continuous flow loop 12 at a first output location 210. Similarly, the second output portion 266 may also configured to extend between the common bypass portion 268 and the continuous flow loop 12 of the AC system 10, with the second output portion 266 being in fluid communication with the common by-pass portion 268 at the common output location 272 and being in fluid communication with the continuous flow loop 12 at a second output location 214. In such an embodiment, the first output location 210 may generally be located on the continuous flow loop 10 so as to allow the HX fluid to be reintroduced back into the flow loop 10 immediately downstream of the condenser 18 whereas the second output location 214 may generally be located on the continuous flow loop 10 so as to allow the HX fluid to be reintroduced back into the flow loop 10 immediately downstream of the evaporator 14.

Moreover, as shown in FIG. 4, the common by-pass portion 268 of the by-pass line 204 may be configured to extend at least partially within the ANG storage vessel 102, thereby allowing for heat to be transferred between the HX fluid flowing through the common by-pass portion 268 and the gas/adsorbent contained within the storage vessel 102. Similar to the embodiment described above, the common by-pass portion 268 may be provided within the ANG storage vessel 102 in a looped or coiled configuration, thereby creating an internal heat exchanger-type arrangement with the interior of the storage vessel 12. For example, as shown in FIG. 4, the common by-pass portion 268 may be coiled in a serpentine-like pattern within the ANG storage vessel 102. Additionally, as shown in FIG. 4, a plurality of heat exchange fins 216 may be also provided in association with the common by-pass portion 268 so as to enhance the heat transfer occurring within the ANG storage vessel 102.

Referring still to FIG. 4, the system 200 may also include a plurality of valves for controlling the flow of HX fluid through the various interconnected portions of the by-pass line 204. For example, as shown in the illustrated embodiment, the system 200 may include both a first input valve 220 positioned at the first input location 208 for controlling the amount of the heated flow 28 directed into the first input portion 260 and a second input valve 224 for controlling the amount of the cooled flow 30 directed into the second input portion 262. In addition, the system 200 may include both a common input valve 274 positioned at the common input location 270 for controlling the amount of HX fluid directed into the common by-pass portion 268 from the first and second input portions 260, 262 and a common output valve 276 positioned at the common output location 272 for directing the flow of HX fluid exiting the common by-pass portion 268 to the first output portion 264 and/or the second output portion 266. Moreover, as shown in FIG. 4, the system 200 may further include both a first output valve 222 positioned at the first output location 210 for directing the HX fluid flowing through the first output portion 264 back into the continuous flow loop 12 of the AC system 10 immediately downstream of the condenser 18 and a second output valve 226 positioned at the second output location 214 for directing the HX fluid flowing through the second output portion 226 back into the continuous flow loop 12 immediately downstream of the evaporator 14.

It should be appreciated that the operation of the various valves may be controlled so as to regulate the temperature of the HX fluid supplied within the ANG storage vessel 102 as well as to control the location at which the HX fluid is reintroduced back into the continuous flow loop 12 of the AC system 10. For example, to provide heating for the ANG storage vessel 102, the operation of the first input valve 220 may be controlled such that all or a portion of the heated flow 28 of HX fluid may be diverted into the first input portion 260 while the operation of the common input valve 274 may be controlled such that the heated flow 28 received from the first input portion 260 is directed through the common by-pass portion 268 to allow temperature within the storage vessel 102 to be increased. The HX fluid exiting the common by-pass portion 268 may then be diverted (e.g., via the common output valve 276) through the first output portion 264 and re-introduced into the continuous flow loop 12 of the AC system 10 via the first output valve 222. Similarly, to provide cooling for the ANG storage vessel 102, the operation of the second input valve 224 may be controlled such that all or a portion of the cooled flow 30 of HX fluid may be diverted into the second input portion 262 while the operation of the common input valve 274 may be controlled such that the cooled flow 30 received from the second input portion 262 is directed through the common by-pass portion 268 to allow the temperature within the storage vessel 102 to be decreased. The HX fluid exiting the common by-pass portion 268 may then be diverted (e.g., via the common output valve 276) through the second output portion 266 and re-introduced back into the continuous flow loop 12 via the second output valve 226.

Moreover, in addition to a purely heated or cooled flow of HX fluid, the operation of the input valves 220, 224, 274 may also be controlled to allow a mixture of the heated and cooled flows 28, 30 to be supplied through the common by-pass portion 268, thereby allowing the system 200 carefully regulate the temperature of the HX fluid supplied within the ANG storage vessel 102. For example, by at least partially opening the first and second input valves 220, 224 such that both a heated flow 28 and cooled flow 30 of HX fluid is supplied to the common input location 270, the common input valve 274 may be controlled in a manner such that a mixture of the heated and cooled flows 28, 30 is directed into the common by-pass portion 268. In doing so, the percentage of the heated flow 28 and the percentage of the cooled flow 30 directed into the common by-pass portion 268 may be carefully selected so as to provide HX fluid within the ANG storage vessel 102 at any suitable temperature between maximum and minimum fluid temperatures of the heated and cooled flows 28, 30, respectively.

As indicated above, it should also be appreciated that the operation of the various valves shown in FIG. 4 may be configured to be controlled automatically via a suitable controller 140. In such an embodiment, the controller 140 may, for example, by configured to transmit suitable control signals for controlling the operation of the valves 220, 222, 224, 226, 274, 276 based on measurement signals received from a temperature sensor(s) 142 and/or a pressure sensor(s) 144 associated with the ANG storage vessel 102.

Figure 5:
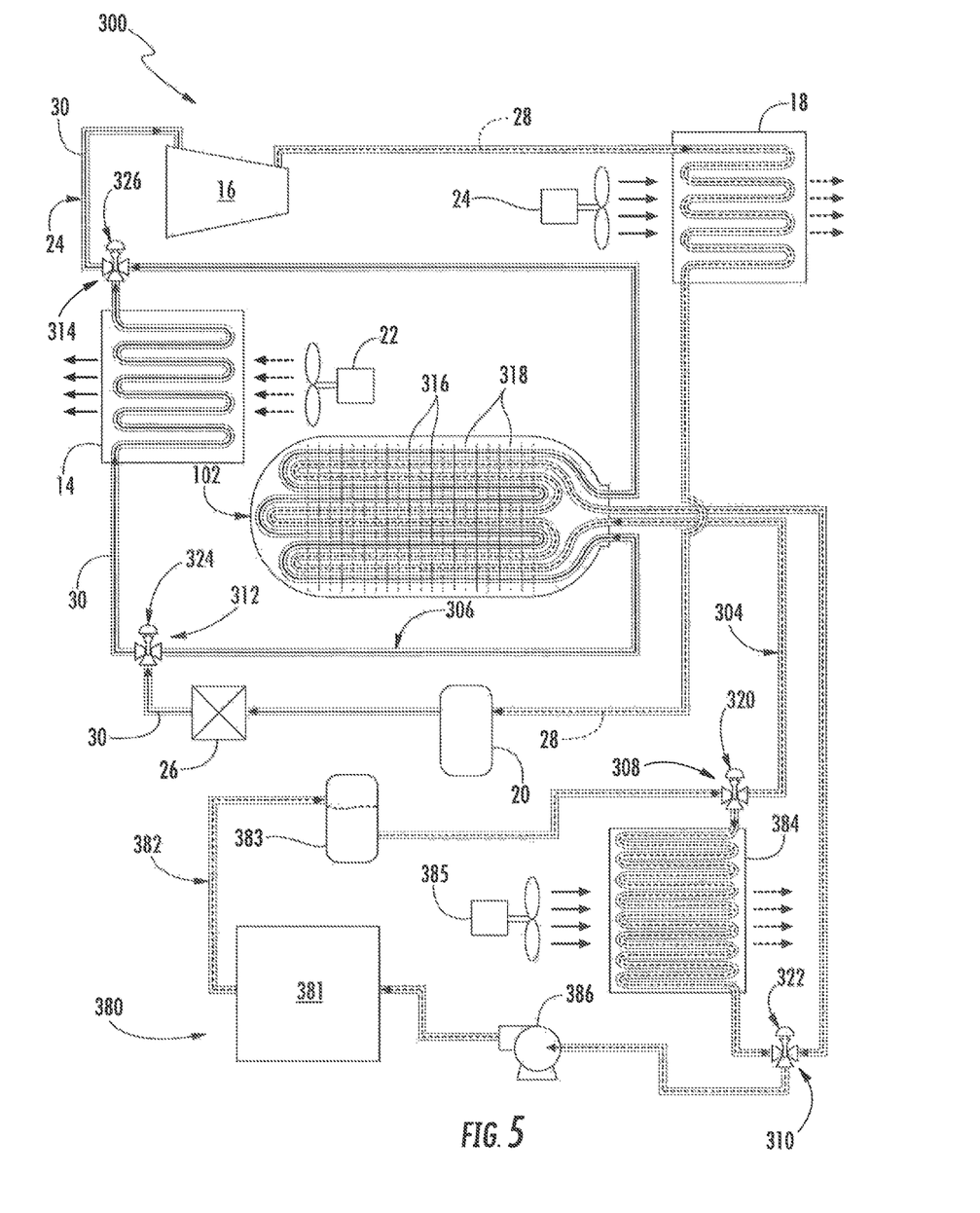
FIG. 5 illustrates a schematic diagram of a further embodiment of a system for controlling the temperature within an adsorbent natural gas (ANG) storage vessel of a vehicle in accordance with aspects of present subject matter, particularly illustrating the system utilizing heated and cooled flows from an engine cooling system and an air conditioning system of a vehicle, respectively, to adjust the temperature within the ANG storage vessel.

Referring now to FIG. 5, yet another embodiment of a system 300 for controlling the temperature within an adsorbent natural gas (ANG) storage vessel 102 of a vehicle is illustrated in accordance with aspects of present subject matter. As shown, similar to the system 100 described above with reference to FIG. 2, the system 300 includes separate hot and cold by-pass lines extending within the ANG storage vessel 102. However, unlike the embodiment described above, the hot by-pass line is in fluid communication with a separate, engine cooling system 380 of the associated vehicle (as opposed to the AC system 10). Such an embodiment may allow for the disclosed system 300 to take advantage of the higher fluid temperatures within the engine cooling system 380 while still allowing the cooling capabilities of the AC system 10 to be utilized for directing the cooled flow 30 of HX fluid through the ANG storage vessel 102.

It should be appreciated that the engine cooling system 380 may generally be configured the same as or similar to any suitable system known in the art for maintaining the operating temperature of a vehicle's engine 381 within a suitable temperature range. For example, as shown in FIG. 5, the engine cooling system 380 may generally form a continuous flow loop 382, wherein a suitable engine heat exchange (EHX) fluid (e.g., water and/or a water anti-freeze mixture) is continuously cycled through the various components of the engine cooling system 380. Specifically, in several embodiments, the EHX fluid may be expelled from an internal cooling circuit (not shown) of the vehicle's engine 381 as a low pressure, heated liquid. The heated EHX fluid may then be directed through a suitable fluid recovery device 383 to a radiator 384 of the engine cooling system 380, within which the EHX fluid is cooled. For example, as shown in FIG. 5, a radiator fan 385 may be configured to direct an air flow across the coils of the radiator 384 to allow some of the heat contained within the EHX fluid to be absorbed into the flow of air, thereby cooling the EHX fluid. The cooled fluid is then directed through a suitable pump 386 (e.g., centrifugal water pump) that increases the pressure of the fluid so that it can be directed back through the engine's internal cooling circuit to provide for cooling for the engine 381.

As shown in FIG. 5, the disclosed system 300 may include both a first by-pass line 304 and a second by-pass line 306. In several embodiments, the first by-pass line 304 may be in fluid communication with the continuous flow loop 382 of the engine cooling system 380 at a first input location 308 and a first output location 310, with the first by-pass line 304 being configured to receive a portion of the heated EHX fluid contained within the engine cooling system 380 at the first input location 308 and expel such EHX fluid back into the continuous flow loop 382 at the first output location 310. For example, as shown in the illustrated embodiment, the first input location 308 is located immediately upstream of the radiator 384 and the first output location 310 is located immediately downstream of the radiator 384. However, in other embodiments, the first input and output locations 308, 310 may be positioned at any other suitable location around the continuous flow loop 382 of the engine cooling system 380 that allows heated EHX fluid to be diverted into the first by-pass line 304.

In several embodiments, the second by-pass line 306 may be configured the same as or similar to the second by-pass line 106 described above with reference to FIG. 2. Specifically, as shown in FIG. 5, the second by-pass line 306 may be in fluid communication with the continuous flow loop 12 of the AC system 10 at a second input location 312 and a second output location 314, with the second by-pass line 306 being configured to receive all or a portion of the cooled flow 30 of HX fluid at the second input location 312 and expel such HX fluid back into the continuous flow loop 12 at the second output location 314.

Additionally, as shown in FIG. 5, at least a portion of each of the first and second by-pass lines 304, 306 may be configured to extend within the ANG storage vessel 102, thereby allowing for heat to be transferred between the HX/EHX fluid flowing within the first and/or second by-pass lines 304, 306 and the gas/adsorbent contained within the storage vessel 102. Similar to the embodiments described above, the portions of the first and second by-pass lines 304, 306 extending within the ANG storage vessel 102 may be provided in a looped or coiled configuration so as to create an internal heat exchanger-type arrangement with the interior of the storage vessel 102. For example, as shown in FIG. 5, the first and second by-pass lines 304, 306 may be coiled in a serpentine-like pattern within the ANG storage vessel 102. Additionally, as shown in FIG. 5, a plurality of heat exchange fins 316, 318 may also be provided in association with the first and second by-pass lines 304, 306 so as to enhance the heat transfer occurring within the ANG storage vessel 102. For instance, a plurality of first heat exchange fins 316 may be provided in association with the first by-pass line 304 and a plurality of second heat exchange fins 318 may be provided in association with the second by-pass line 306.

Referring still to FIG. 5, the system 300 may also include a plurality of valves for controlling the flow of HX/EHX fluid through the first and second by-pass lines 304, 306. For example, as shown in the illustrated embodiment, the system 300 may include a first input valve 320 positioned at the first input location 308 for controlling the amount of the heated EHX fluid directed into the first by-pass line 304 and a first output valve 322 positioned at the first output location 310 for directing such EHX fluid back into the continuous flow loop 382 of the engine cooling system 380. Similarly, the system 300 may include a second input valve 324 positioned at the second input location 312 for controlling the amount of the cooled flow 30 of HX fluid directed into the second by-pass line 306 and a second output valve 326 positioned at the second output location 314 for directing the HX fluid diverted through the second by-pass line 306 back into the continuous flow loop 12 of the AC system 10 immediately downstream of the evaporator 14.

It should be appreciated that, during operation of the disclosed system 300, the various valves may be controlled so as to provide heating and/or cooling to the ANG storage vessel 102. For example, to provide heating for the ANG storage vessel 102, the operation of the first input valve 320 may be controlled such that all or a portion of the heated EHX fluid from the engine cooling system 380 may be diverted into the first by-pass line 304 and subsequently supplied into the storage vessel 102. Similarly, to provide cooling for the ANG storage vessel 102, the operation of the second input valve 324 may be controlled such that all or a portion of the cooled flow 30 of HX fluid may be diverted from the AC system into the second by-pass line 306 and subsequently supplied into the storage vessel 102.

As indicated above, it should also be appreciated that the operation of the various valves shown in FIG. 5 may be configured to be controlled automatically via a suitable controller 140. In such an embodiment, the controller 140 may, for example, by configured to transmit suitable control signals for controlling the operation of the valves 320, 322, 324, 326 based on measurement signals received from a temperature sensor(s) 142 and/or a pressure sensor(s) 144 associated with the ANG storage vessel 102.

Additionally, it should be appreciated that, as an alternative to utilizing the first by-pass line 304 to divert the heated EHX fluid into the ANG storage vessel 102, the continuous flow loop 382 of the engine cooling system 380 may be routed directly through the storage vessel 102. For instance, in one embodiment, the heated EHX fluid expelled from the engine 381 may be routed directly through the storage vessel 102 prior to be supplied into the fluid recovery device 383 or the radiator 384.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling the temperature within a gas adsorbent storage vessel of a vehicle, the system comprising:
   an engine cooling system of the vehicle, the engine cooling system forming a first continuous flow loop of a first heat exchange fluid that is cycled between an engine of the vehicle and a radiator of the engine cooling system in a flow direction, the first continuous flow loop having a first loop section extending from the engine to the radiator in the flow direction of the first heat exchange fluid and a second loop section extending from the radiator to the engine in the flow direction of the first heat exchange fluid;
   an air conditioning system of the vehicle, the air conditioning system forming a second continuous flow loop of a second heat exchange fluid;
   a first by-pass line including a first portion extending within the gas adsorbent storage vessel, the first by-pass line configured to be in selective fluid communication with the first continuous flow loop at a first input location such that, when the first by-pass line is in fluid communication with the first continuous flow loop, the first by-pass line receives a first by-pass flow at the first input location that includes at least a portion of the first heat exchange fluid being cycled through the first continuous flow loop and subsequently expels the first by-pass flow back into the first continuous flow loop at a first output location disposed at a location along the second loop section downstream of the radiator and upstream of the engine relative to the flow direction of the first heat exchange fluid through the first continuous flow loop;
   a second by-pass line including a second portion extending within the gas adsorbent storage vessel, the second by-pass line configured to be in selective fluid communication with the second continuous flow loop at a second input location such that, when the second by-pass line is in fluid communication with the second continuous flow loop, the second by-pass line receives a second by-pass flow at the second input location that includes at least a portion of the second heat exchange fluid being cycled through the second continuous flow loop and subsequently expels the second by-pass flow back into the second continuous flow loop at a second output location associated with the second by-pass line;
   wherein at least one of the first by-pass flow or the second by-pass flow is directed through the gas adsorbent storage vessel via the first by-pass line or the second by-pass line, respectively, so as to adjust an internal temperature within the gas adsorbent storage vessel.

2. The system of claim 1, further comprising a first input valve disposed at the first input location for controlling the amount of the first heat exchange fluid directed through the first by-pass line as the first by-pass flow and a second input valve disposed at the second input location for controlling the amount of the second heat exchange fluid directed through the second by-pass line as the second by-pass flow.

3. The system of claim 2, further comprising a controller communicatively coupled to the first and second input valves, the controller being configured to selectively control the operation of the first input valve to allow the first by-pass flow of the first heat exchange fluid to be directed through the first by-pass line so as to increase the internal temperature within the gas adsorbent storage vessel, the controller being configured to selectively control the operation of the second input valve to allow the second by-pass flow of the second heat exchange fluid to be directed through the second by-pass line so as to decrease the internal temperature within the gas adsorbent storage vessel.

4. The system of claim 1, wherein the gas adsorbent storage vessel corresponds to an adsorbent natural gas (ANG) storage vessel.

5. The system of claim 1, wherein the first heat exchange fluid is cycled along the first continuous flow loop between an engine of the vehicle and a radiator of the engine cooling system.

6. The system of claim 5, wherein the first input location is located upstream of the radiator and downstream of the engine relative to the flow direction of the first heat exchange fluid through the first continuous flow loop.

7. The system of claim 3, further comprising at least one of a pressure sensor or a temperature sensor associated with the gas adsorbent storage vessel, the controller being configured to selectively control the operation of the first and second input valves based on measurement signals received from the at least one of the pressure sensor or the temperature sensor in order to adjust the internal temperature within the gas adsorbent storage vessel.

8. The system of claim 1, wherein the second continuous flow loop of the second heat exchange fluid is directed through one or more air conditioning system components such that the second heat exchange fluid cycles between a heated flow and a cooled flow.

9. The system of claim 8, wherein the air conditioning system includes at least one fan configured to direct an airflow across at least one of the heated flow or the cooled flow of the second heat exchange fluid for subsequent delivery to a passenger compartment of the vehicle.

10. The system of claim 9, wherein the second by-pass flow is used to adjust both the internal temperature within the gas adsorbent storage vessel and an air temperature of the airflow delivered to the passenger compartment of the vehicle.

11. The system of claim 8, wherein the one or more air conditioning system components comprise a compressor, a condenser, a metering device, and an evaporator.

12. The system of claim 1, wherein the first eat exchange fluid differs from the second heat exchange fluid.

* * * * *